Patented Nov. 3, 1931

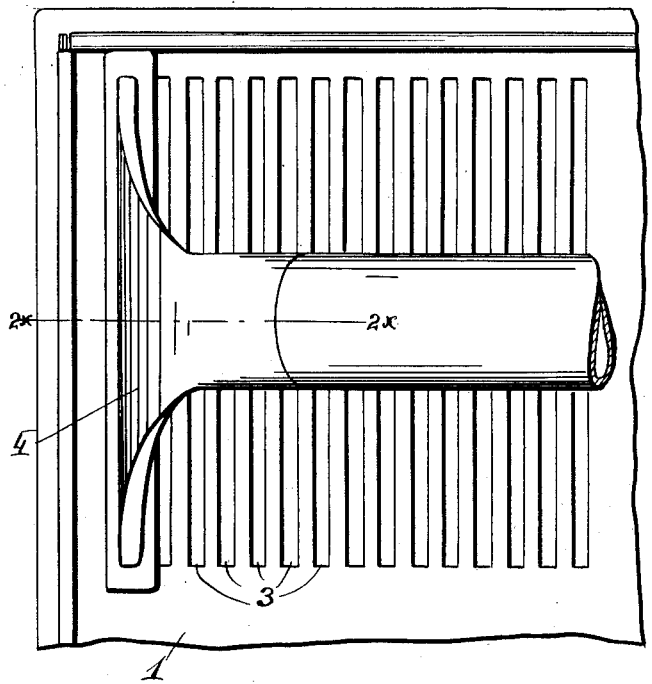
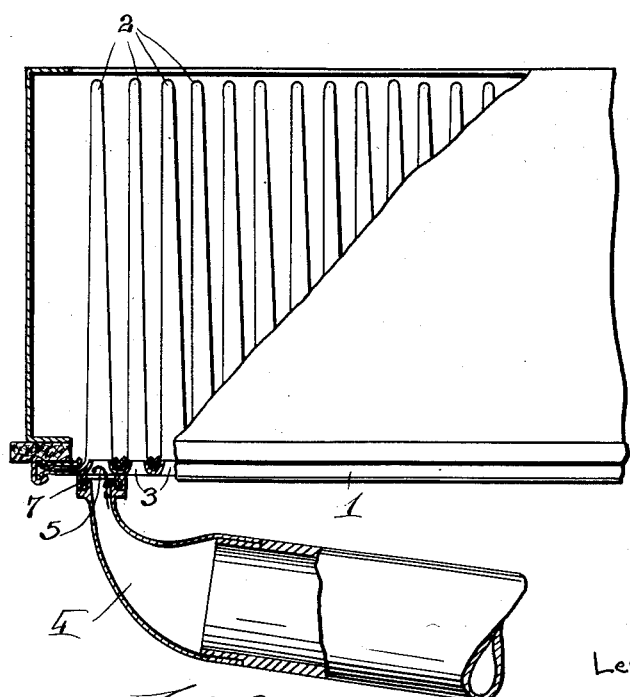
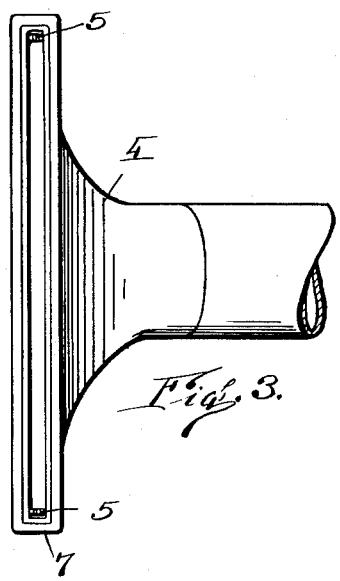

1,830,097

UNITED STATES PATENT OFFICE

LEWIS L. DOLLINGER, OF ROCHESTER, NEW YORK

FILTER AND MEANS FOR CLEANING IT

Application filed June 25, 1928. Serial No. 288,242.

This invention relates to filters especially air filters and means for cleaning such filters by the use of a partial vacuum and the invention has for its object to provide a suitable construction of the frame of the filter that will support the filtering surface in such a manner that consecutive sections thereof can be individually cleaned by means of a partial vacuum.

Another object of this invention is to provide means in conjunction with the construction of the frame whereby the tool for cleaning the filter is guided and located at predetermined positions on the frame.

These and other objects of this invention will be fully illustrated in the drawings, described in the specification and pointed out in the claims at the end thereof.

In the accompanying drawings:

Figure 1 is a front elevation of a portion of a panel filter showing the cleaning tool in position thereon.

Figure 2 is a horizontal section thru a portion of the filter and the cleaning tool, the section being taken on the line 2x—2x of Figure 1.

Figure 3 is a bottom plan view of the cleaning tool.

The invention forming the subject matter of this invention is adapted for use in connection with air filters especially of the type illustrated and described in my prior application Serial No. 280,992 filed May 28, 1928. The filter and the cleaning tool are so constructed that the foreign matter can be easily and quickly removed from consecutive sections of the filter while the filter is in use or out of use.

In the several figures of the drawings like reference numerals indicate like parts.

In the drawings reference numeral 1 indicates the face plate of a panel filter to the rear side of which are suitably clamped a series of filtering pockets 2, 2 that are formed of a wire screen. Over the wire screen is fastened a suitable filtering material such as felt etc. and this felt together with the screen which supports it, is clamped to the face plate as illustrated in order to divide the pockets and separate them at the points of attachment to the face plate.

In the face plate are provided a series of openings 3, 3 which correspond to the open ends of the filtering pockets and these openings are located over the open ends of the filtering pockets and provided individual intakes for each of the filtering pockets. The face plate sections surounding the openings provide seats around the intake of each of the filtering pockets so that the cleaning tool for cleaning the filter can be seated over each opening and the foreign matter within the pocket withdrawn therefrom.

The means for withdrawing the foreign matter from the pockets consists of a nozzle 4 having an opening corresponding in size and outline to the openings provided in the face plate of the panel filter. In the opening of the nozzle are provided a pair of spring fingers 5, 5 that are adapted to engage into the openings in the face plate when the nozzle is placed over one of them. As the nozzle is drawn over the face plate of the filter the spring fingers consecutively enter the openings in the face plate of the filter. In entering each pocket the spring fingers locate the opening in the nozzle directly over the intake of each pocket and hold it in line therewith. The spring fingers also serve as stops against a possible movement of the nozzle along the length of each opening which, if permitted, would uncover part of the opening at one end of the nozzle. For this purpose the spring fingers are located at each end of the opening in the nozzle so that they engage the ends of the openings and prevent an endwise movement of the nozzle.

In order to provide a tight joint between the bottom of the nozzle and the seat formed around each of the intake openings in the face plate a strip of felt 7 is placed around the opening in the nozzle so that when the nozzle is held in contact with the face plate the felt forms a gasket between the nozzle opening and the opening in the face plate.

A suitable connection is made between the nozzle and a vacuum line so that on placing the nozzle over each of the filtering pockets any foreign matter that has adhered to the filtering material is withdrawn from it and enters the vacuum line thru the nozzle to be discharged from the vacuum line at a remote point from the filter.

I claim:

1. A filtering unit and means for cleaning it comprising a face plate having a plurality of openings therein, filtering pockets clamped in place on the back of said face plate in line with each of the openings provided therein, said cleansing means comprising a nozzle having an opening corresponding with one of the openings in said face plate, said nozzle being adapted to slide over said face plate and suck foreign matter from said pockets and yielding means carried by said nozzle in the opening thereof and consecutively engaging the openings in said face plate to hold said nozzle in line with each of the openings on the movement of the nozzle over said face plate.

2. In combination with a filtering unit having a face plate with a series of parallel openings therein and a series of filtering pockets located side by side behind said face plate in line with the openings provided therein, of a nozzle having an opening corresponding to one of said openings in said face plate, a gasket carried by said nozzle and surrounding the opening thereof and projecting beyond said nozzle to provide a yielding extension therefor, said yielding extension being adapted to engage said face plate around each individual opening provided therein for the purpose of forming an air tight joint between said nozzle and each filtering pocket to permit foreign matter to be sucked from the filtering pocket.

In testimony whereof I affix my signature.

LEWIS L. DOLLINGER.